US010820478B1

(12) United States Patent
Ferrari et al.

(10) Patent No.: US 10,820,478 B1
(45) Date of Patent: Nov. 3, 2020

(54) SYSTEM AND METHOD FOR PROVIDING A VISUAL INDICATION OF FIELD SURFACE CONDITIONS

(71) Applicant: CNH Industrial America LLC, New Holland, PA (US)

(72) Inventors: Luca Ferrari, Formigine (IT); Robert A. Zemenchik, Fair Oaks, CA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/525,950

(22) Filed: Jul. 30, 2019

(51) Int. Cl.
| G06K 9/00 | (2006.01) |
| H04N 7/18 | (2006.01) |
| A01B 79/00 | (2006.01) |
| G06T 7/00 | (2017.01) |
| G01N 21/956 | (2006.01) |

(52) U.S. Cl.
CPC .......... *A01B 79/005* (2013.01); *G06T 7/001* (2013.01); *G01N 21/95607* (2013.01); *G06T 2207/30188* (2013.01)

(58) Field of Classification Search
USPC ........ 382/100, 103, 106–107, 108, 154–155, 382/162, 168, 173, 181, 199, 224, 219, 382/232, 254, 274–276, 285–291, 312, 382/110; 348/128, 129, 130
See application file for complete search history.

(56) References Cited

U.S. PATENT DOCUMENTS

| 8,780,177 B2 | 7/2014 | Eccles et al. |
| 9,401,030 B2 | 7/2016 | Nelan |
| 9,405,039 B2 * | 8/2016 | Anderson .............. A01B 79/00 |
| 9,696,897 B2 | 7/2017 | Garcia |
| 9,965,159 B2 * | 5/2018 | Knodt ................. G06F 3/04845 |
| 2012/0307039 A1 | 12/2012 | Holmes |
| 2015/0062331 A1 | 3/2015 | Kamalakannan et al. |
| 2015/0278640 A1 * | 10/2015 | Johnson ................. G06T 7/136 382/110 |
| 2017/0055444 A1 * | 3/2017 | Mahieu ................. A01F 12/446 |
| 2017/0112043 A1 | 4/2017 | Nair et al. |
| 2018/0165884 A1 | 6/2018 | Wagner et al. |

(Continued)

OTHER PUBLICATIONS

Croppartner—Crop Residue Estimator, FieldTRAKS Solutions, dated Dec. 19, 2018, (1 page) https://www.fieldtraks.com/prod_cropresidue.html.

*Primary Examiner* — Seyed H Azarian
(74) *Attorney, Agent, or Firm* — Rebecca L. Henkel; Rickard K. DeMille

(57) ABSTRACT

A system for providing a visual indication of field surface conditions during the performance of an agricultural operation by an agricultural implement includes a user interface, an imaging device provided in operative association with the agricultural implement, and a controller. The imaging device has a field of view directed towards a portion of a surface of a field. The controller is configured to receive image data from the imaging device representing surface features located at the portion of the surface of the field, transmit the image data for display on the user interface, and control the user interface to display at least one digital reference object in association with the image data. The at least one digital reference object provides a visual reference for assessing a characteristic of the surface features displayed on the user interface.

17 Claims, 7 Drawing Sheets

(56) References Cited

U.S. PATENT DOCUMENTS

2018/0206393 A1    7/2018   Stoller et al.
2018/0210450 A1*   7/2018   Ferrari .................. H04N 7/181
2018/0336410 A1   11/2018   Posselius
2019/0387668 A1*   12/2019   Temple ................ A01C 21/005

* cited by examiner

SYSTEM AND METHOD FOR PROVIDING A VISUAL INDICATION OF FIELD SURFACE CONDITIONS

FIELD OF THE INVENTION

The present subject matter relates generally to providing a visual indication of field surface conditions of a field during the performance of an agricultural operation, and more particularly, to a system and method for providing an operator with a visual reference for assessing a characteristic of field surface features within a field.

BACKGROUND OF THE INVENTION

Agricultural implements, such as planters, seeders, tillage implements, and/or the like, are typically configured to perform an agricultural operation within a field, such as a planting/seeding operation, a tillage operation, and/or the like. When performing such agricultural operations, it is desirable to be able to adjust the operation of the implement to account for variations in any field surface conditions that could potentially impact the effectiveness and/or efficiency of the operation. In this regard, systems have been developed that allow surface features, such as clods, residue, and soil roughness, to be assessed along the portion of the field across which the implement is traveling. Adjustments to the operation of the implement may then be made based on the characteristics of the surface features, such as clod size, residue coverage, and roughness level. These systems typically include cameras that capture images of the field. The images are than automatically analyzed within a computer using image processing techniques to assess the surface features captured within the images. However, such image processing often requires significant processing power. Moreover, issues still exist with the reliability and accuracy of assessing surface features using automated image processing techniques.

Accordingly, a system and method for providing a visual indication of characteristics of surface features within images of a field that allows for an effective and/or more reliable assessment of field surface conditions would be welcomed in the technology.

BRIEF DESCRIPTION OF THE INVENTION

Aspects and advantages of the invention will be set forth in part in the following description, or may be obvious from the description, or may be learned through practice of the invention.

In one embodiment, the present subject matter is directed to a system for providing a visual indication of field surface conditions during the performance of an agricultural operation by an agricultural implement. The system includes a user interface, an imaging device provided in operative association with the agricultural implement, and a controller communicatively coupled to the imaging device and the user interface. The imaging device has a field of view directed towards a portion of a surface of a field. The controller is configured to receive image data from the imaging device, where the image data includes a representation of surface features located at the portion of the surface of the field. The controller is further configured to transmit the image data for display on the user interface. Additionally, the controller is configured to control the user interface to display at least one digital reference object in association with the image data, where the at least one digital reference object provides a visual reference for assessing a characteristic of the surface features displayed on the user interface.

In an additional embodiment, the present subject matter is directed to a method for providing a visual indication of field surface conditions during the performance of an agricultural operation of an agricultural implement. The method includes receiving, with a computing device, image data from an imaging device, where the image data includes a representation of surface features located at the portion of the surface of the field. The method further includes transmitting, with the computing device, the image data for display on a user interface. Additionally, the method includes controlling, with the computing device, the user interface to display at least one digital reference object in association with the image data, where the at least one digital reference object provides a visual reference for assessing a characteristic of the surface features displayed on the user interface.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
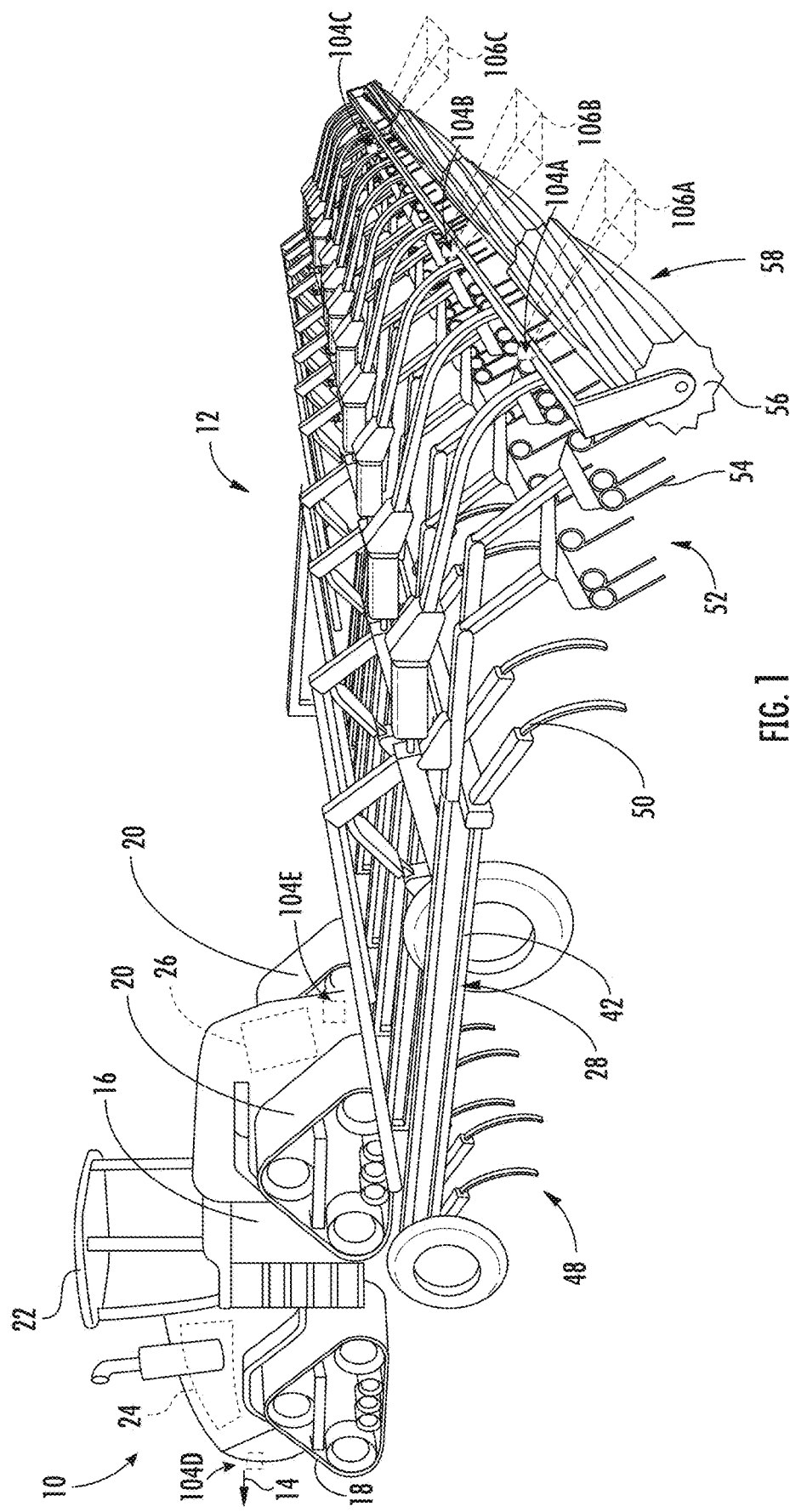
FIG. 1 illustrates a perspective view of one embodiment of an agricultural implement in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for providing a visual indication of field surface conditions to operators of agricultural implements during the performance of an agricultural operation. In particular, the present subject matter is directed to systems and methods for displaying a digital reference object relative to images of the field surface for an operator to more easily determine a field surface condition of a field based on the comparison of the digital reference object relative to surface features within the field. The surface features may include, for example, clods, roughness-related features (e.g., ridges, undulations, etc.), crop residue, and/or the like. Additionally, in one embodiment, the digital reference objects may, for example, include one or more of a digital surface feature (e.g., a digital clod), a ruler, a grid, and/or a set of reference standard images for characterizing the surface features contained within the field images.

In particular, in one example, a computing system can obtain image data that depicts a portion of the field. For example, the image data may be obtained by a camera positioned in a (at least partially) downward-facing direction and physically coupled to a work vehicle or an implement towed by the work vehicle through the field. The computing system can transmit the image data to be displayed on a user interface (e.g., a display located within the cab). The computing system may further control the user interface to display at least one digital reference object associated with the image data. The digital reference object(s) may represent a particular size, shape, level (e.g., roughness level or level of residue coverage), and/or indicator of a characteristic of the surface features that may be present within the displayed images of the field. In some embodiments, the digital reference objects are overlaid onto the field surface images. Particularly, in some embodiments, the digital reference objects are overlaid over surface features identified by the computing device within the field surface images. Alternatively or additionally, in some embodiments, the digital reference objects are positioned adjacent to the images of the field surface.

An operator may determine from the comparison of the digital reference objects to surface features within the images whether the field conditions are within desired parameters. For example, if the digital reference object represents a digital clod having a particular size, an operator may compare the size of the clods within the imaged portion of the field to the size of the digital clods. If the operator determines that the clods within the field are too small or too large, the field surface conditions are not acceptable. In some embodiments, the operator may input a control action to the computing system based on the determined field surface conditions to control one or more components of the implement or work vehicle. In other embodiments, the computing system may automatically control one or more components of the implement or work vehicle based on the determined field surface conditions.

Thus, the disclosed systems and methods enable an operator to efficiently and more accurately assess field surface conditions, which improves control of the work vehicle and/or implement to obtain desired field surface conditions within a field and, as a result, leads to superior agricultural outcomes.

Figure 2:
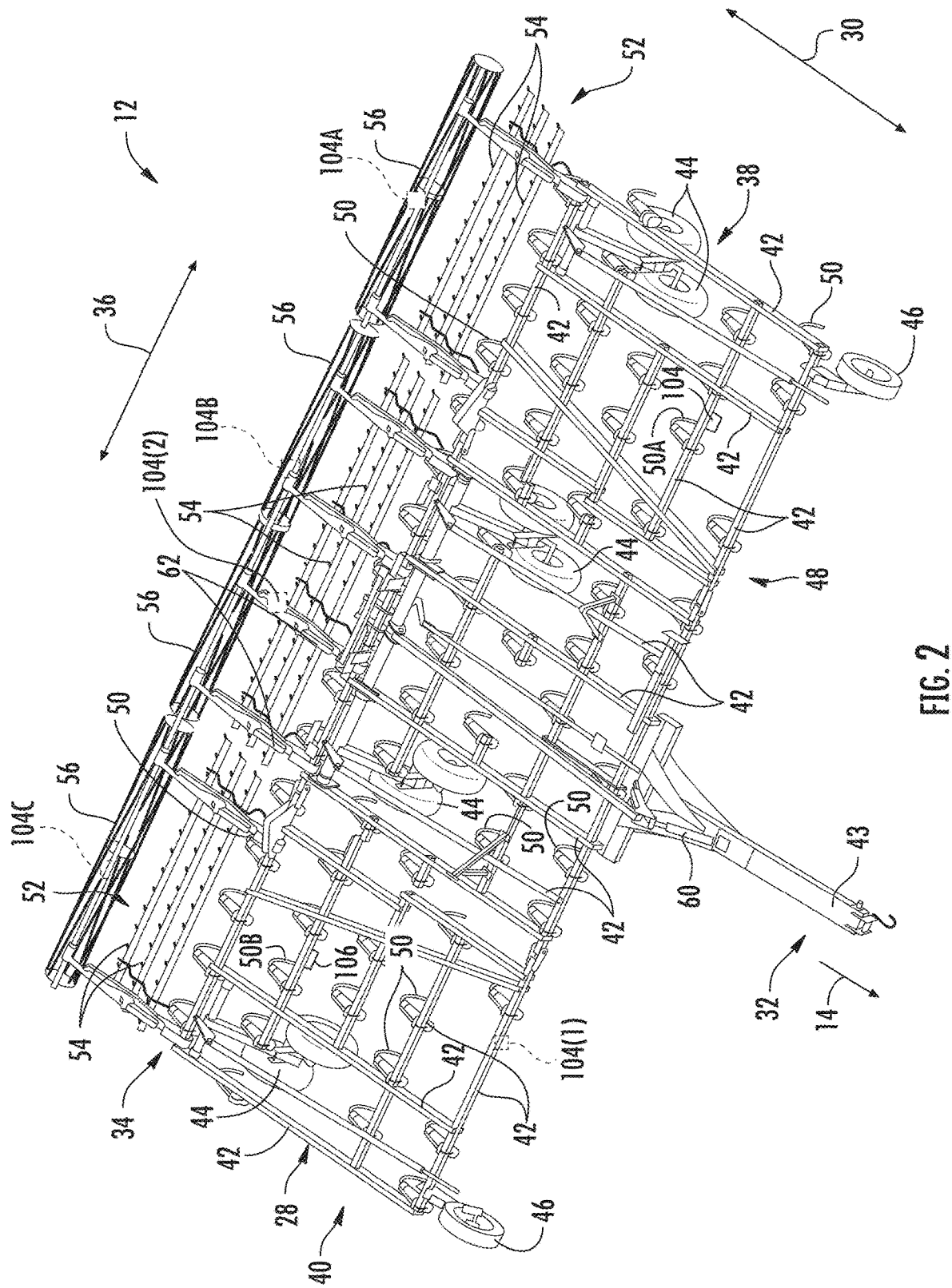
FIG. 2 illustrates a perspective view of the implement shown in FIG. 1.

Referring now to the drawings. FIGS. 1 and 2 illustrate differing perspective views of one embodiment of an agricultural machine in accordance with aspects of the present subject matter. Specifically. FIG. 1 illustrates a perspective view of the agricultural machine including a work vehicle 10 and an associated agricultural implement 12. Additionally, FIG. 2 illustrates a perspective view of the agricultural machine, particularly illustrating various components of the implement 12.

In the illustrated embodiment, the agricultural machine corresponds to the combination of the work vehicle 10 and the associated agricultural implement 12. As shown in FIGS. 1 and 2, the vehicle 10 corresponds to an agricultural tractor configured to tow the implement 12, namely a tillage implement (e.g., a cultivator), across a field in a direction of travel (e.g., as indicated by arrow 14 in FIG. 1). However, in other embodiments, the agricultural machine may correspond to any other suitable combination of work vehicle (e.g., an agricultural harvester, a self-propelled sprayer, and/or the like) and agricultural implement (e.g., such as a seeder, fertilizer, sprayer (a towable sprayer or a spray boom of a self-propelled sprayer), mowers, and/or the like). In addition, it should be appreciated that, as used herein, the term "agricultural machine" may refer not only to combinations of agricultural implements and vehicles, but also to individual agricultural implements and/or vehicles.

As shown in FIG. 1, the vehicle 10 may include a frame or chassis 16 configured to support or couple to a plurality of components. For example, a pair of front track assemblies 18 (only one of which is shown) and a pair of rear track assemblies 20 may be coupled to the frame 16. The track assemblies 18, 20 may, in turn, be configured to support the vehicle 10 relative to the ground and move the vehicle 10 in the direction of travel 14 across the field. Furthermore, an operator's cab 22 may be supported by a portion of the frame 16 and may house various input devices (e.g., a user interface 13 shown in FIGS. 3-5) for permitting an operator to control the operation of one or more components of the vehicle 10 and/or the implement 12. However, in other embodiments, the vehicle 10 may include wheels (not shown) in place of the front and/or rear track assemblies 18, 20. Furthermore, the vehicle 10 may include one or more devices for adjusting the speed at which the vehicle 10 and implement 12 move across the field in the direction of travel 14. Specifically, in several embodiments, the vehicle 10 may include an engine 24 and a transmission 26 mounted on the frame 16.

As shown in FIGS. 1 and 2, the implement 12 may include an implement frame 28. More specifically, the frame 28 may extend along a longitudinal direction 30 between a forward end 32 and an aft end 34. The frame 28 may also extend along a lateral direction 36 between a first side 38 and a second side 40. In this respect, the frame 28 generally includes a plurality of structural frame members 42, such as beams, bars, and/or the like, configured to support or couple to a plurality of components. Furthermore, a hitch assembly 43 may be connected to the frame 28 and configured to couple the implement 12 to the vehicle 10. Additionally, a plurality of wheel assemblies may be coupled to the frame 28, such as a set of centrally located wheels 44 and a set of front pivoting wheels 46, to facilitate towing the implement 12 in the direction of travel 14.

In several embodiments, the frame 28 may support a cultivator 48, which may be configured to till or otherwise break the soil over which the implement 12 travels to create a seedbed. In this respect, the cultivator 48 may include a plurality of ground engaging shanks 50, which are pulled through the soil as the implement 12 moves across the field in the direction of travel 14. In one embodiment, the ground engaging shanks 50 may be configured to be pivotally mounted to the frame 28 in a manner that permits the penetration depths of the ground engaging shanks 50 to be adjusted.

Moreover, as shown in FIGS. 1 and 2, the implement 12 may also include one or more harrows 52. Specifically, in several embodiments, each harrow 52 may include a plurality of ground engaging tines 54 configured to engage to the surface of the soil within the field in a manner that levels or otherwise flattens any windrows or ridges in the soil created by the cultivator 48. As such, the ground engaging tines 54 may be configured to be pulled through the soil as the implement 12 moves across the field in the direction of travel 14. It should be appreciated that the implement 12 may include any suitable number of harrows 52.

Further, in one embodiment, the implement 12 may include one or more baskets or rotary firming wheels 56. In general, the basket(s) 56 may be configured to reduce the number of clods in the soil and/or firm the soil over which the implement 12 travels. As shown, each basket 56 may be configured to be pivotally coupled to one of the harrows 52. Alternatively, the basket(s) 56 may be configured to be pivotally coupled to the frame 28 or any other suitable location of the implement 12. It should be appreciated that the implement 12 may include any suitable number of baskets 56.

Additionally, the implement 12 may also include any number of suitable actuators (e.g., hydraulic cylinders) for adjusting the relative positioning, penetration depth, and/or down force associated with the various ground engaging tools of the implement 12 (e.g., ground engaging tools 50, 54, 56). For instance, the implement 12 may include one or more first actuators 60 (FIG. 2) coupled to the frame 28 for raising or lowering the frame 28 relative to the ground, thereby allowing the penetration depth and/or the down pressure of the shanks 50 and ground engaging tines 54 to be adjusted. Similarly, the implement 12 may include one or more second actuators 62 (FIG. 2) coupled to the baskets 56 to allow the baskets 56 to be moved relative to the frame 28 such that the down pressure on the baskets 56 is adjustable.

In accordance with aspects of the present subject matter, one or more sensors, such as one or more imaging device(s) 104, may be provided in operative association with the implement 12. For instance, FIGS. 1 and 2 illustrate examples of various locations for mounting one or more imaging device(s) 104 for capturing images of the field or other similar image-like data. Specifically, as shown in FIGS. 1 and 2, a first imaging device 104A may be provided at a first location on the implement 12, a second imaging device 104B may be provided at a second location on the implement 12, and a third imaging device 104C may be provided at a third location on the implement 12. Each of the first, second, and third imaging devices 104A, 104B, 104C is positioned at the aft end 34 of the implement 12. Each imaging device 104 has a field of view 106 directed at least partially downwardly towards the field surface. For instance, each of the first, second, and third imaging devices 104A, 104B, 104C has a respective field of view 106A, 106B, 108C generally directed towards the field surface. More particularly, in the illustrated embodiment, the field of view 106A, 106B, 106C of each of the imaging devices 104A, 104B, 104C is directed rearwardly of the implement 12, particularly rearwardly of the baskets 56 along the direction of travel 14. As such, the imaging devices 104A, 104B, 104C may be configured to capture data (e.g., image data) indicative of one or more surface conditions of the field surface after the ground working operations of the implement 12. Such data may then be used to determine field surface conditions, such as soil roughness, residue coverage, and/or clod sizes, after such ground working operations.

In some embodiments, in addition to the implement-based imaging devices 104 (or as an alternative thereto), one or more imaging device(s) 104 may be provided in operative association with the work vehicle 10. For example, a fourth imaging device 104D may be mounted or positioned at the forward end of the vehicle 10 in the direction of travel 14 and/or a fifth imaging device 104E may be mounted at the aft end of the vehicle 10 in the direction of travel 14, as shown in FIG. 1. Such vehicle-based imaging devices 104D, 104E may, for example, be configured to detect the surface condition of the field in front of the implement 12. As such, in several embodiments, the imaging devices 104 may be specifically installed at locations on the work vehicle 10 and/or the implement 12 to allow images to be captured of the field before and/or after the performance of a field operation by the implement 12.

It should be appreciated that, while only three imaging devices 104 are illustrated as being associated with the implement 12, any suitable number of imaging devices 104 may instead be associated with the implement 12. It should further be appreciated that, while the imaging devices 104 associated with the implement 12 (i.e., the imaging devices 104A, 104B, 104C) are shown as only being positioned at the aft end of the implement 12, the imaging devices 104 may be positioned elsewhere on the implement 12, such as adjacent to any of the other ground engaging tools, such as the shanks 50 or the tines 54, such as imaging devices 104(1), 104(2) shown in FIG. 2. Additionally, while the imaging devices 104 are discussed as having a field of view 106 directed rearwardly of the implement 12, it should be appreciated that the imaging devices 104 may be elsewise positioned such that the field of view 106 is directed forward of one or more of the ground engaging tools 50, 54, 56 of the implement 12.

Moreover, it should be appreciated that the imaging devices 104 may correspond to any suitable sensing devices configured to detect or capture image or image-like data indicative of the field surface conditions of the field. For example, the imaging devices 104 may correspond to any suitable device(s) configured to capture images or other image-like data of the field that allow soil clods or other soil features to be detected. For instance, in several embodiments, the imaging device(s) may correspond to any suitable camera(s), such as single-spectrum camera or a multi-spectrum camera configured to capture images, for example, in the visible light range and/or infrared spectral range. Additionally, in a particular embodiment, the camera(s) may correspond to a single lens camera configured to capture two-dimensional images or a stereo camera(s) having two or more lenses with a separate image sensor for each lens to allow the camera(s) to capture stereographic or three-dimensional images. Alternatively, the imaging device(s) 104 may correspond to any other suitable image capture device(s) and/or other vision sensor(s) capable of capturing "images" or other image-like data of the field. For example, the imaging device(s) 104 may correspond to or include radio detection and ranging (RADAR) sensors and/or light detection and ranging (LIDAR) sensors.

Additionally, it should be appreciated that the configuration of the vehicle 10 and the implement 12 described above and shown in FIGS. 1 and 2 are provided only to place the present subject matter in an exemplary field of use. Thus, it should be appreciated that the present subject matter may be readily adaptable to any manner of machine configuration.

Figure 3:
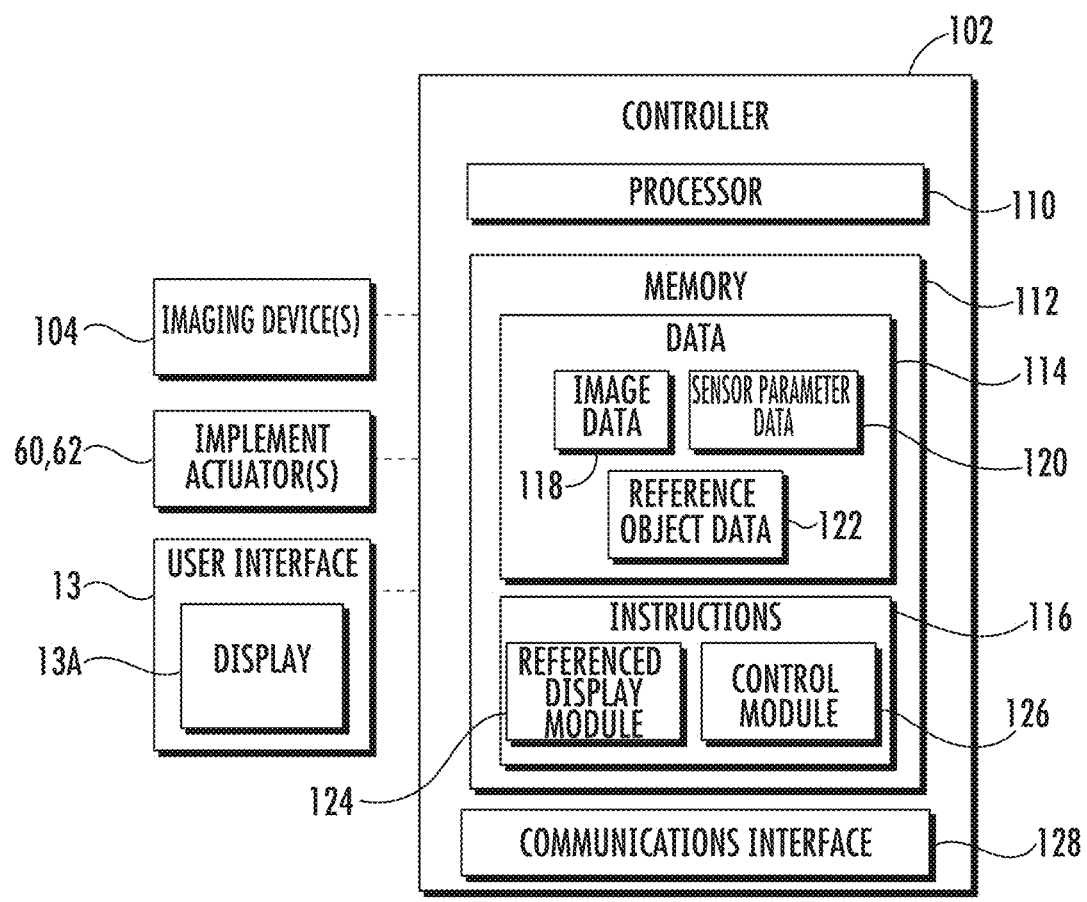
FIG. 3 illustrates a schematic view of one embodiment of a system for providing a visual indication of field surface conditions in accordance with aspects of the present subject matter.

Referring now to FIG. 3, a schematic view of one embodiment of a system 100 for providing a visual indication of field surface conditions of a field is illustrated in accordance with aspects of the present subject matter. In general, the system 100 will be described with reference to the vehicle 10 and the implement 12 described above with reference to FIGS. 1 and 2. However, it should be appreciated by those of ordinary skill in the art that the disclosed system 100 may generally be utilized with agricultural machines having any other suitable machine configuration. Additionally, it should be appreciated that, for purposes of illustration, communicative links or electrical couplings of the system 100 shown in FIG. 3 are indicated by dashed lines.

As shown in FIG. 3, the system 100 may include a controller 102 and various other components configured to be communicatively coupled to and/or controlled by the controller 102, such as one or more sensors configured to capture field surface conditions of a field (e.g., imaging device(s) 104), a user interface (e.g., user interface 13), and/or various components of the implement 12. The user interface 13 described herein may include, without limitation, any combination of input and/or output devices that allow an operator to provide operator inputs to the controller 102 and/or that allow the controller 102 to provide feedback to the operator, such as a keyboard, keypad, pointing device, buttons, knobs, touch sensitive screen, mobile device, audio input device, audio output device, and/or the like. For instance, as shown in FIG. 3, the user interface 13 may include an electronic display 13A for displaying information to the operator and/or for receiving inputs from the operator.

In general, the controller 102 may correspond to any suitable processor-based device(s), such as a computing device or any combination of computing devices. Thus, as shown in FIG. 3, the controller 102 may generally include one or more processor(s) 110 and associated memory devices 112 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 112 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 112 may generally be configured to store information accessible to the processor(s) 110, including data 114 that can be retrieved, manipulated, created and/or stored by the processor(s) 110 and instructions 116 that can be executed by the processor(s) 110.

It should be appreciated that the controller 102 may correspond to an existing controller for the vehicle 10 or the implement 12 or may correspond to a separate processing device. For instance, in one embodiment, the controller 102 may form all or part of a separate plug-in module that may be installed in operative association with the vehicle 10 or the implement 12 to allow for the disclosed system and method to be implemented without requiring additional software to be uploaded onto existing control devices of the vehicle 10 or the implement 12.

In several embodiments, the data 114 may be stored in one or more databases. For example, the memory 112 may include an image database 118 for storing image data received from the imaging device(s) 104. For example, the imaging devices 104 may be configured to continuously or periodically capture images of the field or other image-like data associated with the field as an operation is being performed with the field. In such an embodiment, the data transmitted to the controller 102 from the imaging device(s) 104 may be stored within the image database 118 for subsequent processing and/or analysis. It should be appreciated that, as used herein, the terms image data or image-like data may include any suitable type of data received from the imaging device(s) 104 that allows for the field surface conditions of a field to be analyzed by an operator, including photographs or other images, RADAR data, LIDAR data, and/or other image-related data (e.g., scan data and/or the like).

Further, as shown in FIG. 3, the memory 112 may include a sensor parameter database 120. The sensor parameter database 120 may be configured to store information related to the imaging device(s) 104 that may be used to generate an image scale associated with the image data. The image scale may correlate the display size of the image captured in the image data to a "real-world" size. For example, the image scale may correlate the dimensions of the displayed image generated from the image data, e.g., in number of pixels, to the dimensions of the field surface captured within the image, e.g., in inches, feet, meters, and/or the like.

The sensor parameter database 120 may also be configured to store information related to each of a plurality of mounting positions of the imaging device(s) 104 on the work vehicle 10 and/or implement 12. For example, the sensor parameter database 120 may store a distance between the mounting position of each imaging device 104 and the field surface. The distance between the imaging device(s) 104 and the field surface may generally be used to generate an image scale associated with the image data. In some instances, the imaging device(s) are installed at a position that is movable relative to the field surface, for example on the frame 48 of the implement 12 or on one of the baskets 56, such that the sensor parameter database 120 may be configured to store a relationship between an extension of an actuator(s) (e.g., one or more of the implement actuators 60, 62) and the distance of the imaging device(s) 104 from the field surface. In other embodiments, the imaging device(s) 104 may further be configured to measure the distance between the imaging device(s) 104 and the field surface. Additionally or alternatively, in some embodiments, the system 100 may further include a distance sensor positioned generally proximate to the imaging device(s) 104 that is configured to measure the distance between the imaging device(s) 104 and the field surface.

The sensor parameter database 120 may further or alternatively be configured to receive and/or store a zoom setting input received from the operator via the user interface 13 (e.g., by selecting a zoom setting interface element 121 (FIGS. 4A-5B) presented to the user on the display 13A). The zoom setting input may, for example, correspond to a request for adjusting the zoom setting of the imaging device 104. Each zoom setting may correspond to a different image scale.

Additionally, as shown in FIG. 3, the memory 112 may include a reference object database 122 storing information about digital reference objects for display relative to the images stored in the image database 118. For example, the controller 102 may be configured to store information regarding different types of digital reference objects within the reference object database 122. For instance, as will be described below with reference to FIGS. 4A-5B, the digital reference object(s) 152 may, for example, be at least one of a digital surface feature, a ruler, a grid, or a reference standard image set. In one embodiment, the controller 102 may be configured to receive and store a reference object input corresponding to one or more of the types of digital reference objects stored in the reference object database 122. For example, as shown in FIGS. 4A-5B, an operator may select a reference object type (e.g., via a reference object type interface element 156 presented on the display 13A).

Further, the controller 102 may be configured, in some embodiments, to receive and store a reference object gauge input corresponding to a gauge of the reference object. For example, as will be described in greater detail with reference to FIGS. 4A-4D, an operator may input or adjust a reference object gauge using a reference object gauge interface element 158 presented on the display 13A. The controller 102 may further be configured to store information regarding a scale parameter associated with the digital reference object (s). Similar to the image scale, the scale parameter may correlate the display size of the reference object to a "real-world" size. For example, the scale parameter may correlate the dimensions of the displayed reference object, e.g., in number of pixels, to the dimensions of the field surface captured within the image, e.g., in inches, feet, meters, and/or the like. In some embodiments, the controller 102 may be configured to adjust the scale parameter associated with the digital reference object(s) based on the determined image scale. Particularly, in some embodiments, the controller 102 may be configured to adjust the scale parameter to be equal to the image scale. For instance, in some embodiments, the scale parameter may initially be stored as a pre-determined or pre-set scale parameter before an image scale is known. As such, the scale parameter may need to be updated upon determination of the image scale such that the scale parameter corresponds to the "real-world" size of the image.

Figure 4A:
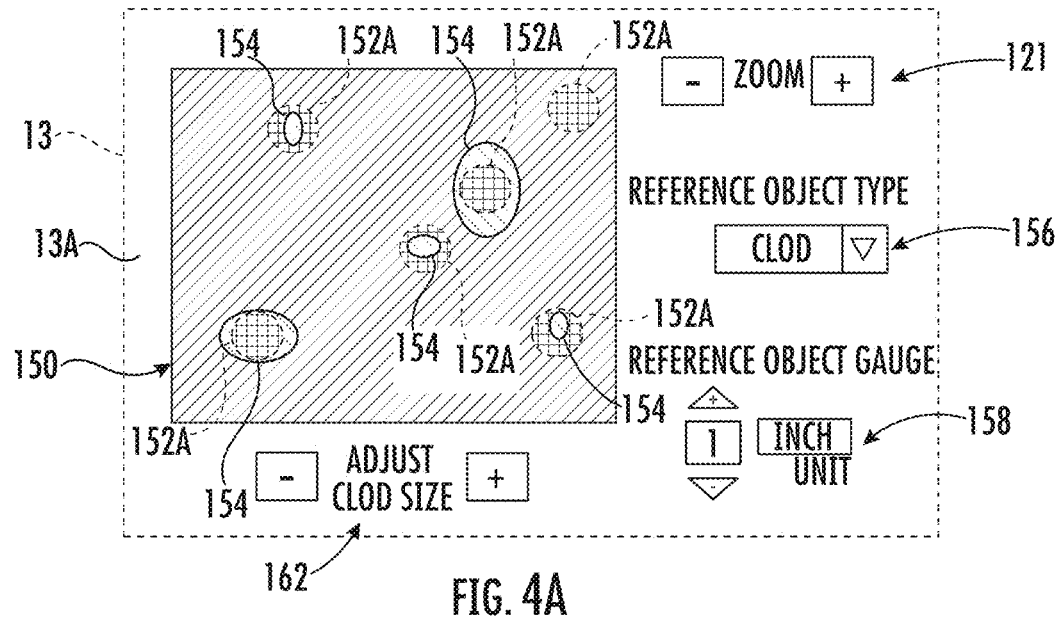
FIG. 4A illustrates one embodiment of a graphical user interface including a reference object generated using the system in accordance with aspects of the present subject matter, particularly illustrating the graphical user interface including digital surface features superimposed onto a field surface image.
Figure 4B:
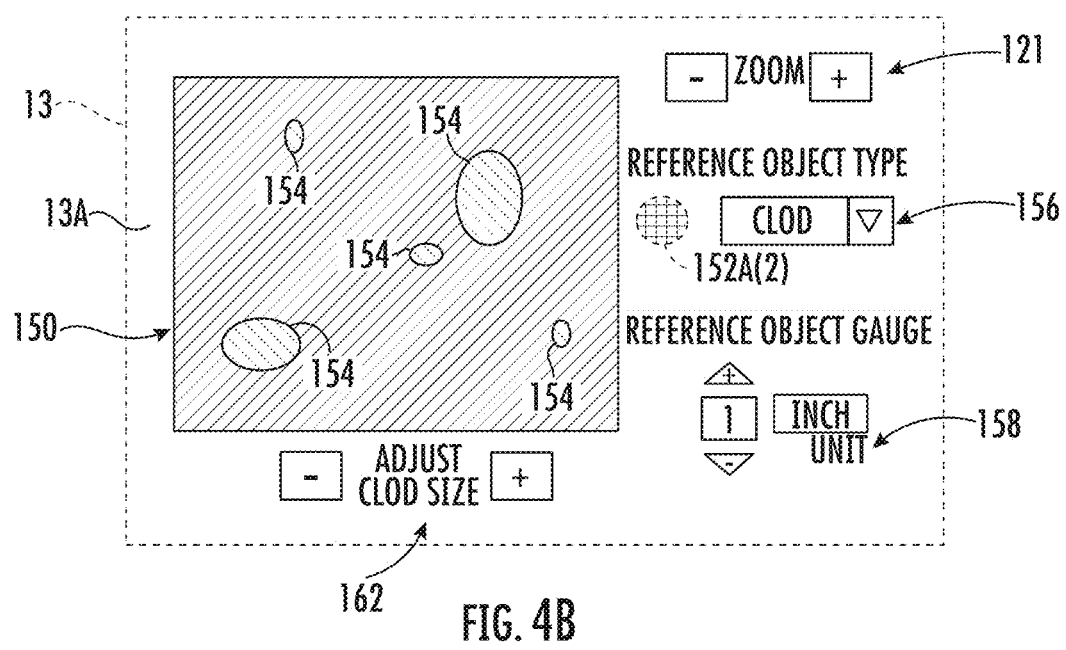
FIG. 4B illustrates another embodiment of a graphical user interface including a reference object generated using the system in accordance with aspects of the present subject matter, particularly illustrating the graphical user interface including a digital surface feature positioned adjacent to a field surface image.

As described above, in one embodiment, the digital reference object 152 may be a digital surface feature. Each digital surface feature is configured to approximate characteristics, such as a shape and/or a size, of a surface feature within the field, such as, for example, a clod, a rock, and/or the like. The shape of the digital surface features may be predetermined and stored in the reference object database 122. For example, one example of a digital surface feature 152A is illustrated in FIGS. 4A and 4B. As shown in FIGS. 4A and 4B, the digital surface feature 152A corresponds to a digital clod. Each digital clod 152A is configured to be generally circular in shape to approximate the 2-D shape of a clod within the field. However, it should be appreciated that the digital clod(s) 152A may have any other suitable shape, e.g., elliptical. The gauge of the digital clod(s) 152A is adjustable via the reference object gauge interface element 158 displayed on the graphical user interface presented to the operator and, in the illustrated embodiment, corresponds to the diameter of the circular digital clod(s) 152A. For instance, as shown in FIGS. 4A and 4B, the diameter of the digital clod(s) 152A is selected as 1 inch to allow the operator to visually assess any clods contained within the displayed image relative to such 1-inch size reference. However, it should be appreciated that the digital clods 152A may have any other diameter, such as 0.5 inch, 1.5 inches, or 2 inches, or, in the instance of other clod shapes, such as an elliptical digital clod, the gauge may represent a major diameter or a minor diameter of an elliptical digital clod. The digital surface features 152A, e.g., the digital clods, may thus be used to approximate size of the clods within the images of the field surface.

Figure 4C:
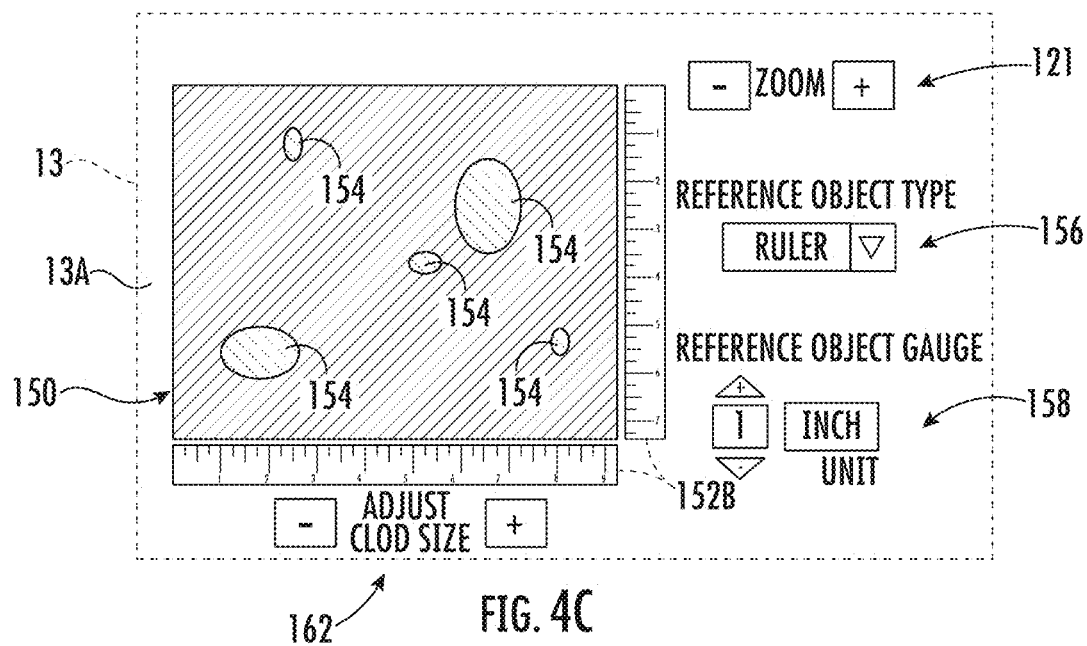
FIG. 4C illustrates a further embodiment of a graphical user interface including a reference object generated using the system in accordance with aspects of the present subject matter, particularly illustrating the graphical user interface including digital rulers positioned adjacent to a field surface image.

Alternatively or additionally, as described above, the digital reference object may be configured as a digital ruler 152B, as shown in FIG. 4C. The gauge of the digital ruler 152B may be adjustable, for example, using the reference object gauge interface element 158 and, in the illustrated embodiments, corresponds to the major increment of the ruler. For example, as shown in FIG. 4C, the major increment of the ruler is selected as 1 inch to allow the operator to visually assess any clods contained within the displayed image relative to such 1-inch scale. However, it should be appreciated that the digital ruler(s) 152B may have any other major increment, such as 0.5 inch, 1.5 inches, or 2 inches. It should further be appreciated that, while two rulers 152B are shown in the example graphical user interface illustrated in FIG. 4C, any suitable number of rulers 152B may be displayed, such as 1 ruler, 3 rulers, 4 rulers, etc. The ruler 152B may thus be used to approximate size of the surface features, e.g., clods, within the images of the field surface.

Figure 4D:
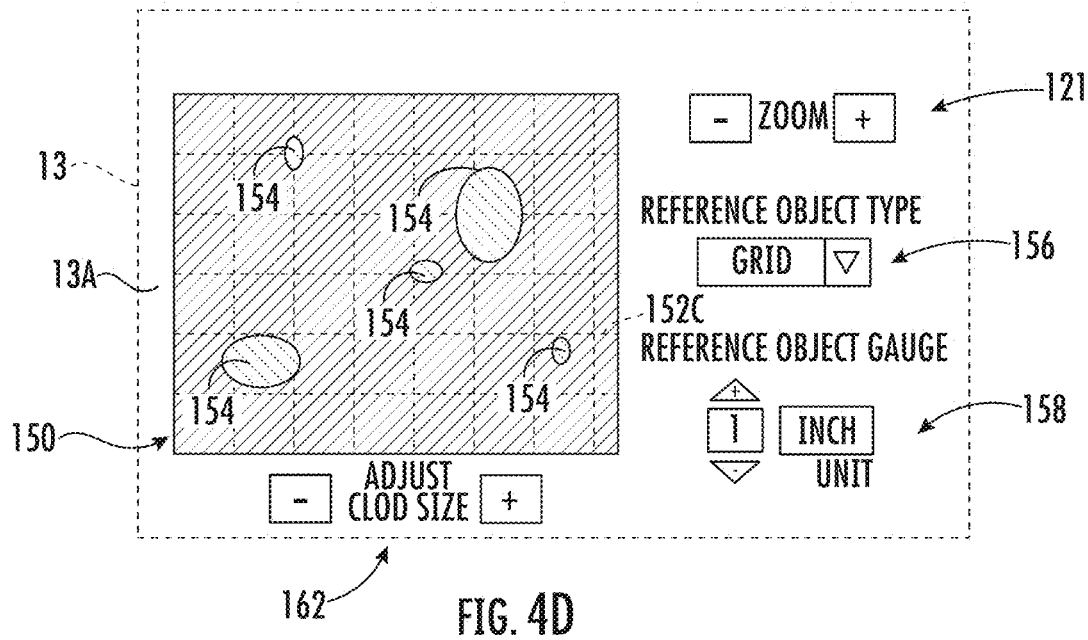
FIG. 4D illustrates an additional embodiment of a graphical user interface including a reference object generated using the system in accordance with aspects of the present subject matter, particularly illustrating the graphical user interface including a grid superimposed onto a field surface image.

Further, as described above, the digital reference object may be, in some embodiments, configured as a digital grid 152C, as shown in FIG. 4D. The digital grid 152C may similarly have a gauge that is adjustable using the reference object gauge interface element 158, which, in the illustrated embodiment, corresponds to a distance between major gridlines of the grid 152C. For example, as shown in FIG. 4D, the distance between the major gridlines is selected as 1 inch to allow the operator to visually assess any clods contained within the displayed image relative to such 1-inch grid scale. However, it should be appreciated that the digital grid 152C may have any other distance between major gridlines, such as 0.5 inch, 1.5 inches, or 2 inches. Such grid 152C may be used to approximate size of the surface features, e.g., clods, within the images of the field surface.

Figure 5A:
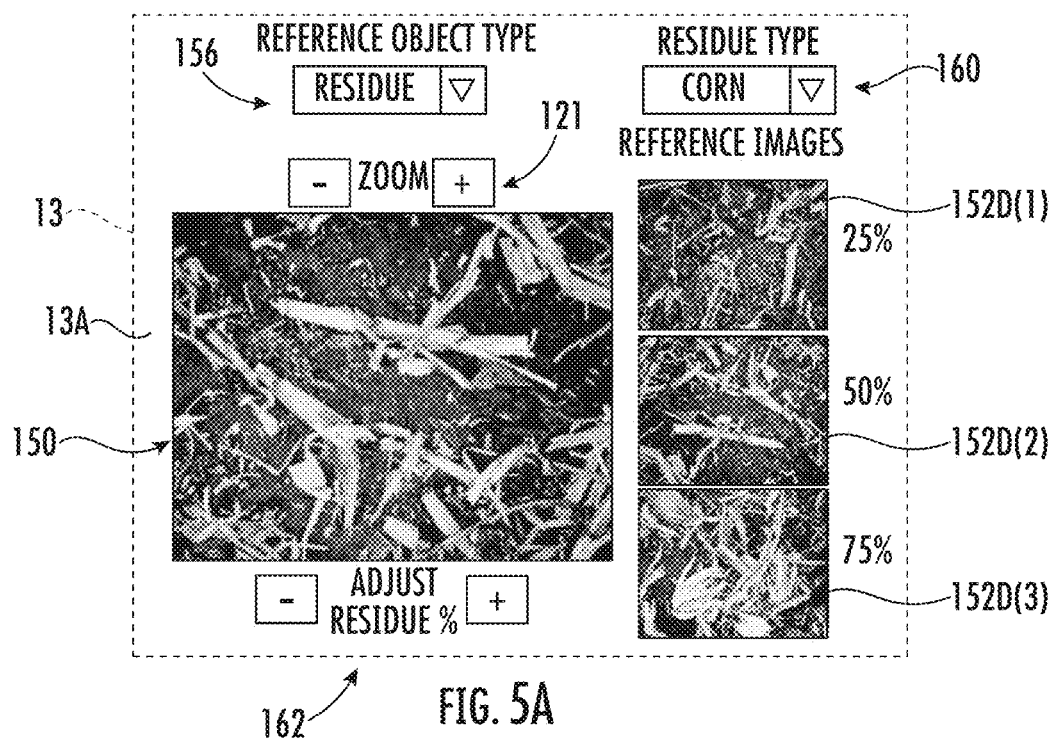
FIG. 5A illustrates another embodiment of a graphical user interface including a reference object generated using the system in accordance with aspects of the present subject matter, particularly illustrating the graphical user interface including reference percent residue images positioned adjacent to a field surface image.
Figure 5B:
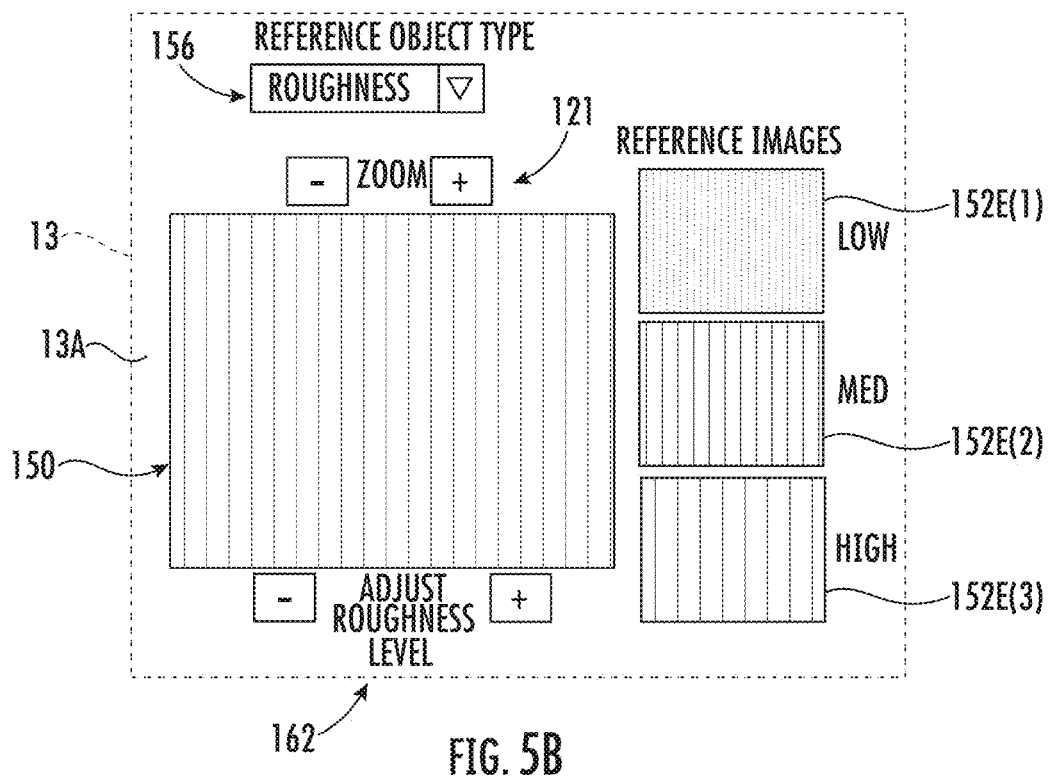
FIG. 5B illustrates yet another embodiment of a graphical user interface including a reference object generated using the system in accordance with aspects of the present subject matter, particularly illustrating the graphical user interface including reference soil roughness level images positioned adjacent to a field surface image.

Furthermore, as shown in FIGS. 5A and 5B, the digital reference object may, instead, correspond to one or more reference standard images 152D, 152E for display relative to the images stored in the image database 118. In one embodiment, as shown in FIG. 5A, each reference standard image 152D may, for example, represent a different percentage of crop residue coverage for a given crop type. In such embodiment, the controller 102 may further be configured to receive an indication of the residue type to be assessed via a residue type interface element 160 displayed on the graphical user interface. For instance, in the illustrated embodiment, the reference standard images 152D correspond to corn residue coverage, with a first reference standard image 152D(1) corresponding to 25% residue coverage of the field surface, a second reference standard image 152D(2) corresponding to 50% residue coverage of the field surface, and a third reference standard image 152D(3) corresponding to 75% residue coverage of the field surface. However, it should be appreciated that other types of crop residue may be represented, such as, for example, soybean, sunflower, tobacco, wheat, and oat. Similarly, as shown in FIG. 5B, each reference standard image 152E may represent a different soil roughness level. For example, a first reference standard image 152E(1) corresponds to a low soil roughness level of the field surface, a second reference standard image 152E(2) corresponds to a medium soil roughness level of the field surface, and a third reference standard image 152E(3) corresponds to a high soil roughness level of the field surface. It should be appreciated that, instead of displaying a set of images, the controller 102 may be configured to receive an input from the operator via the user interface 13 corresponding to displaying a single standard image representing a particular surface condition characteristic, such as a certain percentage of residue coverage or a certain soil roughness level. Further, it should be appreciated that the percentages and levels provided herein should not be construed as limiting. Such reference standard image sets 152D, 152E may thus be used to approximate the residue coverage and the soil roughness, respectively, within the images of the field surface.

Additionally, the controller 102 may be configured to store information regarding a position of the reference object 152 for display relative to the image data. The image data 118 may be displayed to the operator, for example, within an image display portion 150 of the graphical user interface presented via the interface display 13A. In one embodiment, the digital reference objects 152 may be configured to be displayed as a superimposed object over a portion of the displayed image data 118. For example, as shown in FIGS. 4A and 4D, the digital surface features 152A and the grid 152C are superimposed over the image data 118 displayed within the image display portion 150 of the graphical user interface. Particularly, in some embodiments, the reference objects 152 may be configured to be displayed as superimposed objects over surface features 154 within the image data 118. For example, as shown in FIG. 4A, some of the digital clods 152A are superimposed over at least some of the surface features 154, particularly clods, within the displayed image data 118. As will be described in greater detail below, in some embodiments, the controller 102 may be further configured to automatically identify such surface features within the displayed images. Alternatively or additionally, in some embodiments, each of the reference objects 152 may be displayed adjacent to or alongside the image data 118 displayed within the image display portion 150 of the graphical user interface. For instance, as shown in at least FIGS. 4B, 4C, 5A, and 5B, the digital clod 152A(2), the digital rulers 152B, and reference standard images 152D, 152E are presented to the operator within the graphical user interface at locations adjacent to the image display portion 150. However, it should be appreciated that the digital reference objects 152 may be arranged in any other suitable way relative to the displayed image data or in any suitable combination such that an operator may determine the characteristics of the surface features captured within the image data.

Referring back to FIG. 3, in several embodiments, the instructions 116 stored within the memory 112 of the controller 102 may be executed by the processor(s) 110 to implement a referenced display module 124. The referenced display module 124 may generally be configured to generate a referenced view of the field surface shown in the image data 118 with at least one of the digital reference objects 152A, 152B, 152C, 152D, 152E described above displayed relative to the image data 118 based on the sensor parameter data 120 and the reference object data 122. For example, as discussed above with reference to FIGS. 4A and 4D, the controller 102 may be configured to superimpose the digital reference object(s) 152A, 152C over the image data 118. In such an embodiment, the controller 102 may be configured to analyze the image data 118 received from the imaging device(s) 104 using one or more image processing techniques to automatically identify one or more surface features 154 within the image data 118. For instance, with reference to the embodiment shown in FIG. 4A, the controller 102 may be configured to execute one or more image processing techniques to automatically identify the clods contained within the images to allow the associated digital clods 152A to be superimposed over all or a portion of such identified clods. Alternatively, the controller 102 may be configured to receive, via the user interface 13, inputs from an operator identifying the locations of any surface features (e.g., clods) contained within the displayed image data. As discussed above with reference to FIGS. 4B, 4C, 5A, and 5C, the controller 102 may instead or additionally be configured to position the digital reference object(s) 152A, 152B, 152D, 152E adjacent to the displayed image data 118. Regardless of the relative positioning of the digital reference object(s), the referenced view of the field surface may allow an operator to more easily determine whether one or more characteristics of the displayed surface features, such as clod size, soil roughness, and/or residue coverage, differ from target or desired values, and thus, whether the field surface conditions are desirable or need adjusting.

Moreover, as shown in FIG. 3, the controller 102 may also include a communications interface 128 to provide a means for the controller 102 to communicate with any of the various other system components described herein. For instance, one or more communicative links or interfaces (e.g., one or more data buses) may be provided between the communications interface 128 and the imaging device(s) 104 to allow images or other image data transmitted from the imaging device(s) 104 to be received by the controller 102. Similarly, one or more communicative links or interfaces (e.g., one or more data buses) may be provided between the communications interface 128 and the user interface 13 to allow operator inputs to be received by the controller 102 and to allow the controller 102 to control the operation of one or more components of the user interface 13 (e.g., the display 13A) to present a referenced view of the field to the operator.

Additionally, as shown in FIG. 3, one or more communicative links or interfaces (e.g., one or more data buses) may be provided between the communications interface 128 and the implement actuator(s) 60, 62, and/or the like to allow the controller 102 to control the operation of such system components. For example, the instructions 116 stored within the memory 112 of the controller 102 may also be executed by the processor(s) 110 to implement a control module 126. In general, the control module 126 may be configured to adjust the operation of the implement 12 by controlling one or more components of the implement 12 or the work vehicle 10. Specifically, in several embodiments, the controller 102 may be configured to receive an input from the operator, e.g., via a surface feature adjustment interface element 162 (FIGS. 4A-5B) presented on the graphical user interface, that one or more of the field surface conditions differ from target or desired values. For example, the input from the operator may include whether the field surface condition is below the target value and needs to be increased, or that the field surface condition is above the target value and need to be decreased.

In some embodiments, the controller 102 may further be configured to perform one or more control actions based on corresponding inputs received from the operator. For instance, in some embodiments, the controller 102 may be configured to automatically perform one or more predetermined control actions, e.g., adjustments of the operation of one or more components of the implement 12 or vehicle 10, based on the input(s) received from the operator. Alternatively, in other embodiments, the controller 102 may be configured to receive a control action input from the operator associated with the selection of a specific control action for adjusting the operation of one or more of the components of the implement or the vehicle 10 to improve the field surface conditions. For example, in one embodiment, an operator may determine, using the referenced view, that clods within the field are too large and may instruct the controller 102 to execute a specific control action to increase extend or retract the frame actuator 60 in a manner that increases the aggressiveness of the tillage implement 12 and/or to extend or retract the basket actuators 62 in a manner that increases the down force applied to the baskets. In another example, the operator may determine, from the referenced view, that the residue coverage on the field is greater than the desired amount and may request that controller 102 execute appropriate control actions for increasing the amount of crop residue being incorporated into the soil.

It should be appreciated that while the various interface elements 121, 156, 158, 162 are shown in FIGS. 4A-5B as being presented on the graphical user interface for interaction with a user, the various interface elements 121, 156, 158, 162 may be provided, at least in part, separately from the graphical user interface having the image display portion 150. For example, the various interface elements 121, 156, 158, 162 may comprise any suitable user interface elements, such as a keyboard, keypad, pointing device, buttons, knobs, touch sensitive screen, mobile device, audio input device, audio output device, and/or the like described above, separate from the display 13A.

Figure 6:
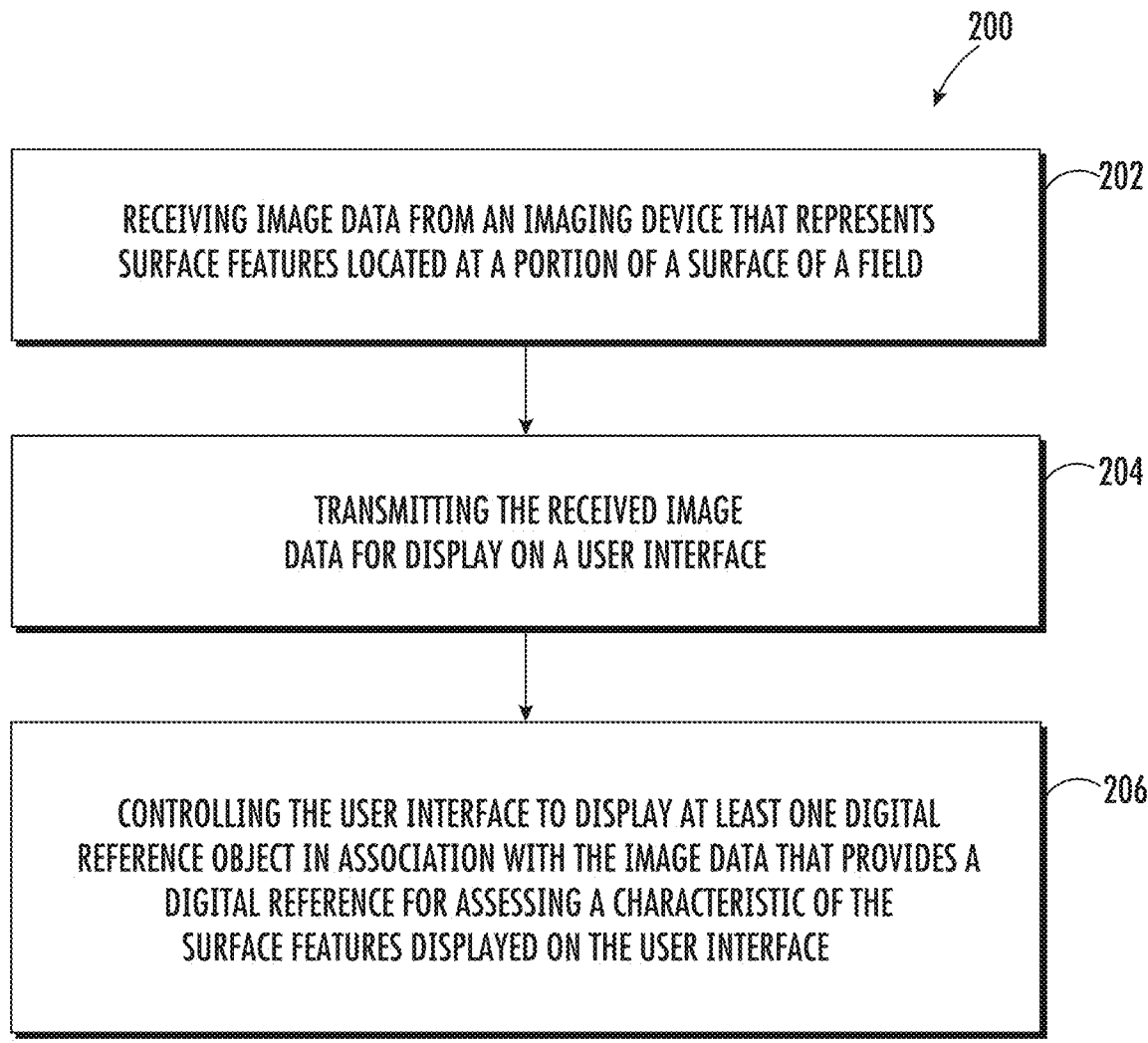
FIG. 6 illustrates a flow diagram of one embodiment of a method for providing a visual indication of field surface conditions in accordance with aspects of the present subject matter.

Referring now to FIG. 6, a flow diagram of one embodiment of a method 200 for providing a visual indication of field surface conditions is illustrated in accordance with aspects of the present subject matter. In general, the method 200 will be described herein with reference to the work vehicle 10 and the implement 12 shown in FIGS. 1 and 2, as well as the various system components shown in FIG. 3. However, it should be appreciated that the disclosed method 200 may be implemented with work vehicles and/or implements having any other suitable configurations and/or within systems having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the method disclosed herein can be omitted, rearranged, combined, and/or adapted in various ways without deviating from the scope of the present disclosure.

As shown in FIG. 6, at (202), the method 200 may include receiving image data from an imaging device that represents surface features located at a portion of a surface of a field. For instance, as described above, the controller 102 may receive image data from an imaging device 104 having a field of view 106 directed towards a portion of the field, with the image data including a representation of surface features located within such portion of the field, such as clods, crop residue, and/or soil roughness.

Further, as shown at (204), the method 200 may include transmitting the received image data for display on a user interface. For instance, as described above, the controller 102 may transmit the image data to the user interface 13 for display, for example, on the display 13A of the user interface 13.

Additionally, as shown at (206), the method 200 may include controlling the user interface to display at least one digital reference object in association with the image data that provides a visual reference for assessing a characteristic of the surface features displayed on the user interface. For instance, as described above, the controller 102 may control the user interface 13 to display at least one digital reference object 152A, 152B, 152C, 152D, 152E in association with the image data. In such instance, the digital reference object(s) 152A, 152B, 152C, 152D, 152E provides the operator with a visual reference for assessing a characteristic of the surface features displayed on the user interface 13, such as the size of clods displayed within image, the percent residue coverage of crop residue displayed within the image, and/or the soil roughness level of the surface of the field displayed within the image.

It is to be understood that, in several embodiments, the steps of the method 200 are performed by the controller 102 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, in several embodiments, any of the functionality performed by the controller 102 described herein, such as the method 200, are implemented in software code or instructions which are tangibly stored on a tangible computer readable medium. The controller 102 loads the software code or instructions via a direct interface with the computer readable medium or via a wired and/or wireless network. Upon loading and executing such software code or instructions by the controller 102, the controller 102 may perform any of the functionality of the controller 102 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for providing a visual indication of field surface conditions during the performance of an agricultural operation by an agricultural implement, the system comprising:
 a user interface;
 an imaging device provided in operative association with the agricultural implement, the imaging device having a field of view directed towards a portion of a surface of a field; and
 a controller communicatively coupled to the imaging device and the user interface, the controller being configured to:
 receive image data from the imaging device, the image data including a representation of surface features located at the portion of the surface of the field;
 transmit the image data for display on the user interface; and
 control the user interface to display at least one digital reference object in association with the image data, the at least one digital reference object providing a visual reference for assessing a characteristic of the surface features displayed on the user interface;
 wherein the controller is further configured to determine an image scale associated with the image data based on a position of the imaging device relative to the surface of the field; and
 wherein the controller is configured to adjust a scale parameter associated with the at least one digital reference object based on the determined image scale.

2. The system of claim 1, wherein the controller is further configured to receive an operator input associated with adjusting a position, a gauge, or a scale associated with the at least one digital reference object.

3. The system of claim 1, wherein the at least one digital reference object is displayed as a superimposed object over a portion of the image data on the user interface.

4. The system of claim 1, wherein the at least one reference object is displayed as a superimposed object over surface features within the image data on the user interface.

5. The system of claim 1, wherein the at least one digital reference object is displayed adjacent to the image data on the user interface.

6. The system of claim 1, wherein the at least one digital reference object is at least one of a digital surface feature, a ruler, or a grid.

7. The system of claim 1, wherein the characteristic is associated with at least one of a clod size of clods in the field, a residue coverage of residue in the field, or a soil roughness level of the field.

8. The system of claim 1, wherein the at least one digital reference object comprises at least one reference image representative of a percentage of residue coverage or a soil roughness level.

9. The system of claim 1, wherein the imaging device is at least one of a camera, a RADAR sensor, or a LIDAR sensor.

10. The system of claim 1, wherein the controller is further configured to receive a control action input from the operator via the user interface, the controller being additionally configured to control one or more operations of the agricultural implement based on the received control action input.

11. A method for providing a visual indication of field surface conditions during the performance of an agricultural operation of an agricultural implement, the method comprising:
 receiving, with a computing device, image data from an imaging device, the image data including a representation of surface features located at the portion of the surface of the field;
 transmitting, with the computing device, the image data for display on a user interface;
 controlling, with the computing device, the user interface to display at least one digital reference object in association with the image data, the at least one digital reference object providing a visual reference for assessing a characteristic of the surface features displayed on the user interface;
 determining, with the computing device, an image scale associated with the image data based on the position of the imaging device relative to the surface of the field; and
 adjusting, with the computing device, a scale parameter associated with the at least one digital reference object based on the determined image scale.

12. The method of claim 11, further comprising receiving an operator input associated with adjusting a position, a gauge, or a scale associated with the at least one digital reference object.

13. The method of claim 11, wherein controlling the user interface to display the at least one digital reference object comprises controlling the user interface to display the at least one digital reference object as a superimposed object over a portion of the image data on the user interface.

14. The method of claim 11, wherein controlling the user interface to display the at least one digital reference object comprises controlling the user interface to display the at least one digital reference object adjacent to the image data on the user interface.

15. The method of claim 11, wherein controlling the user interface to display the at least one digital reference object comprises controlling the user interface to display the at least one digital reference object as at least one of a digital surface feature, a ruler, or a grid.

16. The method of claim 11, wherein controlling the user interface to display the at least one digital reference object comprises controlling the user interface to display the at least one digital reference object as at least one reference image.

17. The method of claim 11, further comprising:
 receiving, with the computing device, a control action input from the operator via the user interface, and
 controlling, with the computing device, one or more operations of the agricultural implement based on the received control action input.

* * * * *